May 13, 1958   G. H. MULLER ET AL   2,834,640
MOTOR VEHICLE DRIVELINE MOUNTING

Filed May 31, 1955   2 Sheets-Sheet 1

GH. MULLER.
W. E. DAVIS.
INVENTORS.

BY E.C. McRae.
J.R. Faulkner.
T. H. Oster.
ATTYS.

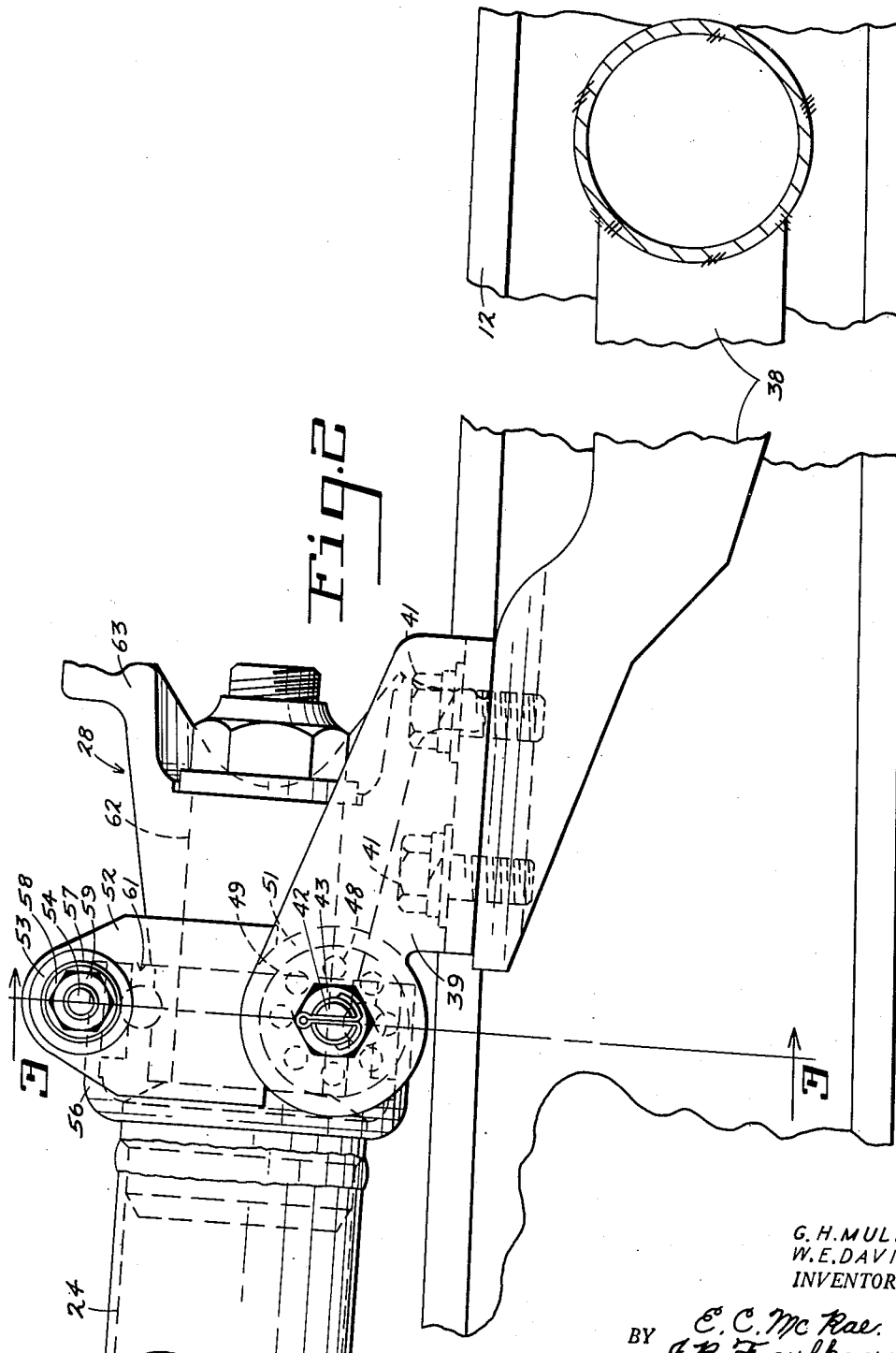

United States Patent Office 2,834,640
Patented May 13, 1958

2,834,640

MOTOR VEHICLE DRIVELINE MOUNTING

George H. Muller and William E. Davis, Northville, Mich., assignors to Ford Motor Company, Dearborn, Mich., a corporation of Delaware Application May 31, 1955, Serial No. 512,122

1 Claim. (Cl. 308—28)

This invention relates generally to driveline mountings for motor vehicles.

In motor vehicles incorporating front and rear drive shafts and three universal joints between the engine and the rear axle, it is necessary to provide a mounting adjacent the mid-joint to rotatably support the driveline. This mounting should dampen vibrations originating in the driveline and in addition should accommodate limited axial movement of the driveline resulting from movement of the rear axle and rear springs during vehicle operation. These objectives are obtained in the present invention by providing a pivotal suspension for the mid-joint bearing, with the suspension incorporating a pair of vertically spaced pivotal connections extending parallel to each other in a horizontal direction transversely of the vehicle. In an embodiment of the invention the bearing housing supports a horizontal tranverse pivot shaft secured to the upper portion thereof and extending beyond the sides thereof. A pair of vertically disposed hangers straddle the bearing housing and are pivotally connected at their upper ends to the extending ends of this pivot shaft, and at their lower ends are pivotally connected to a pair of mounting brackets supported upon the vehicle frame and located vertically beneath the pivot shaft and spaced transversely outwardly therefrom. Flexible mounts are incorporated in the last mentioned pivotal connections to dampen vibrations in the driveline.

Other objects and advantages of this invention will be made more apparent as this description proceeds, particularly when considered in connection with the accompanying drawings, wherein:

Figure 2 is an enlarged side elevational view of the mounting shown in Figure 1.

Figure 1:
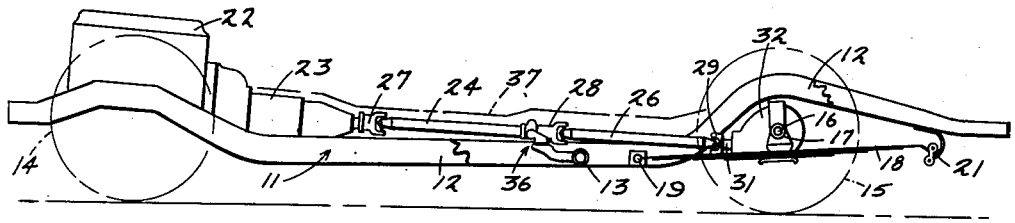
Figure 1 is a side elevational view of a motor vehicle chassis incorporating the present invention.

Referring now to the drawings, and particularly to Figure 1, the reference character 11 indicates generally a motor vehicle frame having a pair of laterally spaced side frame rails 12 and an intermediate tubular cross frame member 13 extending transversely between the side frame rails 12. Front and rear road wheels 14 and 15 are provided, the rear wheels 15 being driven by axle shafts 16 housed within axle tubes 17 and suspended from the vehicle frame by means of longitudinally extending leaf springs 18. The springs 18 are connected to the vehicle side frame rails 12 by means of front and rear spring hangers 19 and 21 respectively, and are interconnected intermediate their ends to the axle tubes 17.

The rear road wheels are driven by a power train including an engine 22, transmission 23, and front and rear drive shafts 24 and 26 respectively. A universal joint 27 interconnects the transmission and the front drive shaft 24, while a second universal joint 28 interconnects the front and rear drive shafts 24 and 26. The rear drive shaft 26 drives through a third universal joint 29 to a pinion shaft 31 journaled in the rear axle housing 32 and operatively connected by means of a conventional differential gearing (not shown) to the rear axle shafts 16.

A mid-joint mounting 36 is provided, to rotatably support the rearward end of the front drive shaft 24 adjacent the universal joint 28, to permit the floor tunnel 37 to be relatively low in height. The mid-joint mount 36 is more fully shown in Figures 2 and 3.

Referring now to Figure 2, an inverted channel shaped mounting bracket 38 is welded at its rearward end to the tubular cross frame member 13, and extends forwardly therefrom generally in alignment with the longitudinal center line of the vehicle. At its forward end the mounting bracket 38 carries a pair of L-shaped supporting brackets 39 secured to the mounting bracket 38 by means of bolts 41. The L-shaped supporting brackets 39 are laterally spaced from each other and are located on the opposite sides of the front drive shaft 24.

Figure 3:
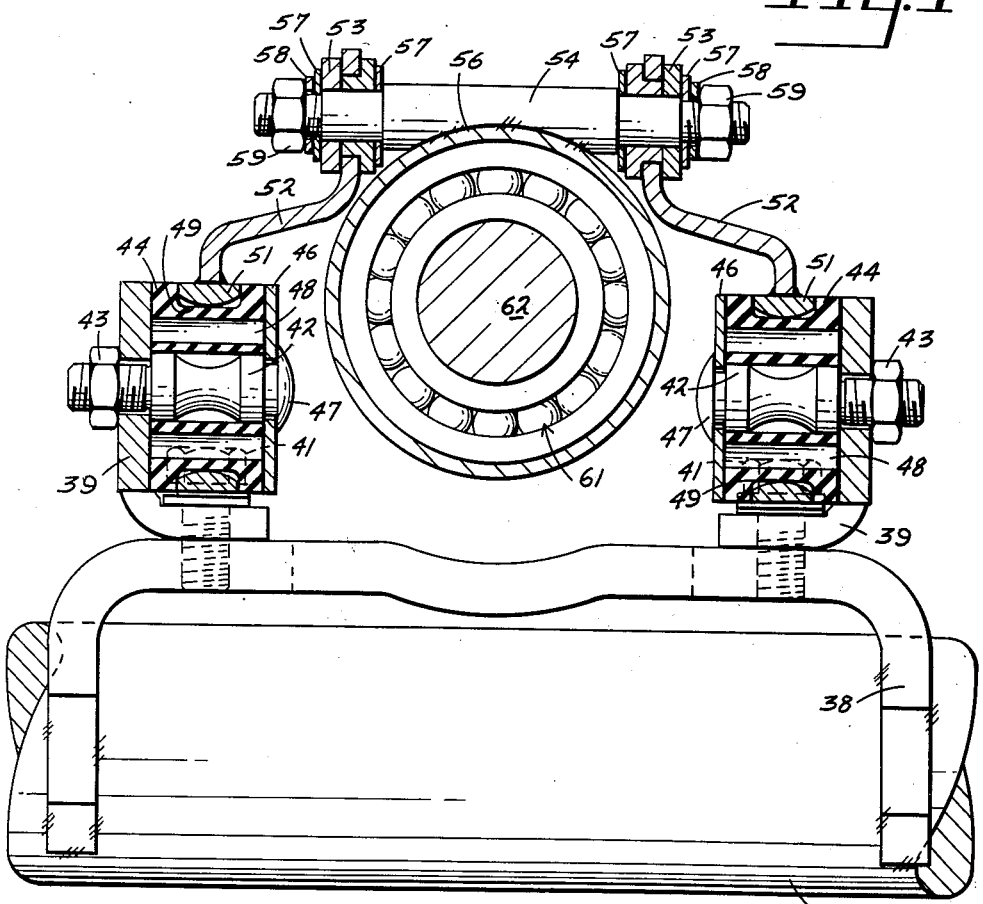
Figure 3 is a vertical cross sectional view taken on the plane indicated by the line 3—3 of Figure 2.

As best seen in Figure 3, each supporting bracket carries a shouldered stud 42 secured thereto by means of a nut 43. A resilient rubber bushing 44 is sleeved over each of the shouldered studs 42, and is held between the supporting bracket 39 and a washer 46 held on the stud by means of a head 47.

Each rubber bushing 44 is formed with a circular series of axially extending openings 48 therethrough to add to their resiliency. Each bushing is also formed with a central peripheral groove 49 receiving a ring 51. A vertically disposed hanger 52 is welded to the ring 51 and extends vertically upwardly therefrom. Each hanger 52 is offset inwardly toward the longitudinal axis of the drive shaft and at its upper end is apertured to receive a bushing 53.

The bushings 53 are sleeved upon the extending ends of a pivot shaft 54 welded to the upper portion of a bearing housing 56. Retaining rings 57, washers 58 and nuts 59 complete the assembly to pivotally mount the hangers 52 upon the pivot shaft 54.

The bearing housing 56 is in the form of a sleeve embracing and supporting a ball bearing assembly 61 rotatably supporting the front drive shaft extension 62, which in turn forms a mounting for the front yoke 63 of the mid-joint 28.

It will be seen that the above described mounting forms a compact construction having a low over-all vertical height and providing a pair of vertically spaced pivotal axes accommodating fore and aft movement of the front drive shaft 24 resulting from spring and axle movements. The axis of the pivot shaft 54 and the common axis of the two shouldered studs 42 extend transversely of the vehicle and are parallel to each other and horizontal. Angular movement of the hangers 52 about these axes accommodates the fore and aft movement of the drive shaft and co-operates with the resilient bushings 44 and the bushings 53 to insulate drive shaft vibrations from the frame while providing the necessary axial movement.

It will be understood that the invention is not to be limited to the exact construction shown and described, but that various changes and modifications may be made without departing from the spirit and scope of the invention, as defined in the appended claim.

What is claimed is:

In combination, a vehicle frame member, a vehicle driveline, a cylindrical bearing housing surrounding said driveline, a bearing assembly within said bearing housing rotatably supporting said driveline, a cylindrical trunnion extending horizontally and at right angles to the axis of said driveline and rigidly secured to the upper portion of said cylindrical bearing housing and projecting beyond the lateral sides thereof, a bracket secured to said frame member and extending directly beneath said driveline, said bracket having vertically extending flanges on opposite sides of said driveline vertically overlapping the lower portion of said cylindrical bearing housing, and a pair of vertically extending supporting members for said bearing housing, each of said supporting members having its lower end pivotally connected to one of the flanges of said bracket and its upper end pivotally connected to one of the projecting ends of said trunnion, the upper end of each of said supporting members being offset inwardly from the lower end of said supporting member toward the vertical plane through the axis of said driveline for pivotal connection to said trunnion closely adjacent said cylindrical bearing housing, the axes of the pivotal connections at the corresponding ends of said supporting members being in alignment with each other to form a pair of vertically spaced parallel axes accommodating limited movement of said bearing housing and said bearing assembly axially of said driveline axis.

References Cited in the file of this patent

UNITED STATES PATENTS

| | | |
|---|---|---|
| 2,450,279 | Guy | Sept. 28, 1948 |
| 2,682,434 | Guy | June 29, 1954 |
| 2,687,787 | Gair | Aug. 31, 1954 |